UNITED STATES PATENT OFFICE.

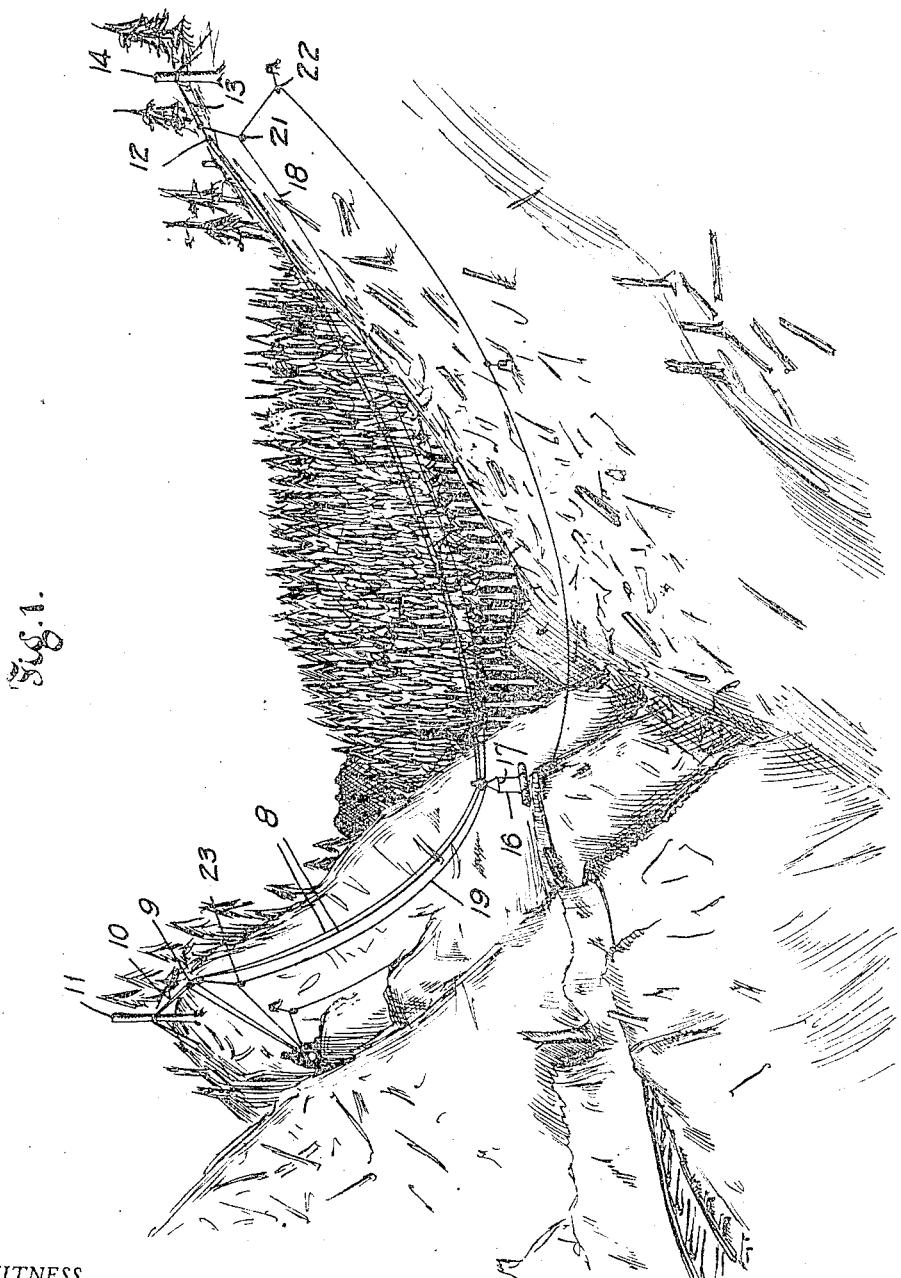

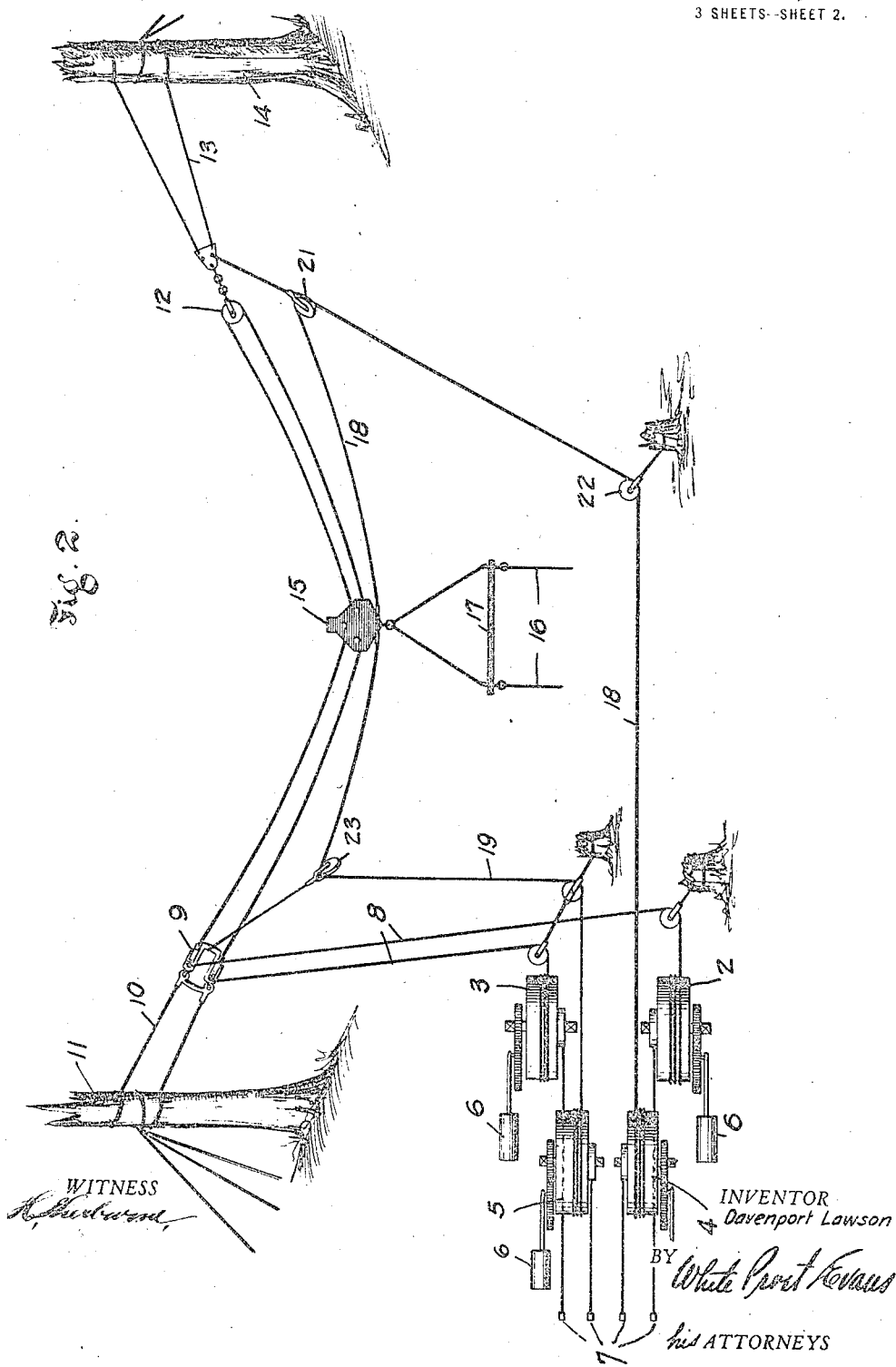

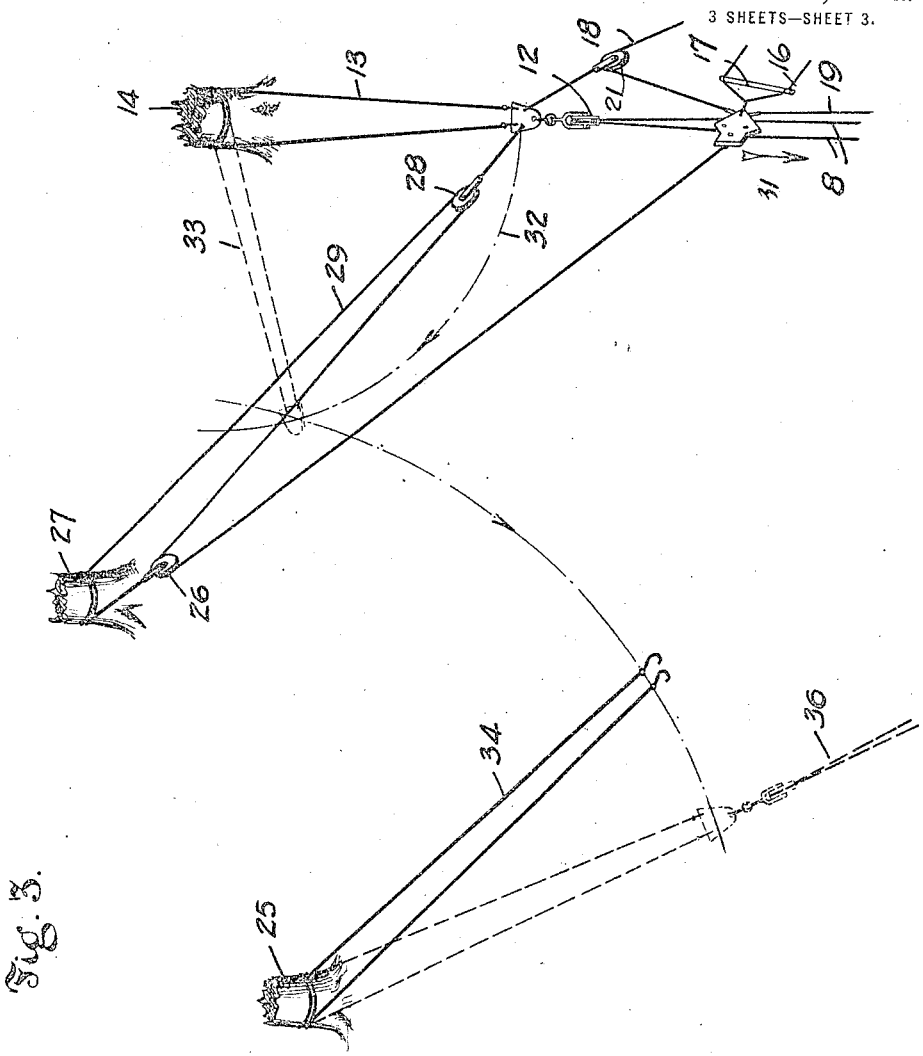

DAVENPORT LAWSON, OF ELK, CALIFORNIA, ASSIGNOR TO GOODYEAR REDWOOD CO., OF ELK, CALIFORNIA, A CORPORATION OF MAINE.

LOGGING APPARATUS.

1,394,745.    Specification of Letters Patent.    Patented Oct. 25, 1921.

Application filed January 17, 1921. Serial No. 437,692.

*To all whom it may concern:*

Be it known that I, DAVENPORT LAWSON, a citizen of the United States, and a resident of Elk, county of Mendocino, and State of California, have invented a new and useful Logging Apparatus, of which the following is a specification.

My invention relates to apparatus for handling the logs after the trees are felled.

An object of the invention is to provide an apparatus for handling logs in which the engine may be set at any convenient point in the valley, or on the slopes of the hills, or on the ridge, and the logs cleared from both slopes and loaded direct upon the cars.

Another object is to provide an apparatus with which the logs may be loaded at greatly increased speed.

Another object is the provision of a rigging which may be shifted or advanced with but inconsequential delays.

The apparatus is particularly suitable for use in broken, rough country where the timber is thin, and has operated successfully over distances as wide as 5000 feet.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a perspective view showing a typical set up of my logging apparatus. Fig. 2 is a diagrammatic view of the apparatus. Fig. 3 is a diagrammatic view of the apparatus connected and ready for shifting one end of the line.

My apparatus comprises an engine including four drums 2, 3, 4 and 5, each drum preferably actuated by a suitable steam cylinder 6 and provided with suitable brakes 7, to control the unwinding movement, so that the drums may be operated independently or together. Drums 2 and 3 are for the lifting line 8, which supports the weight of the logs. The two ends of the lifting line are connected one to each drum 2 and 3. Each side or reach of the lifting line, which may be several thousand feet long is passed through a double lead block 9 anchored by lines 10 to a convenient tree 11 upon the slope of the hill above the logs to be handled. The lifting line then passes through a tail block 12 anchored by lines 13 to a convenient tree 14 across the valley upon the opposite slope. The position of the two spar trees 11 and 14 is such that the lifting line, swinging between them, lies over the center of the territory to be covered during that particular setting of the apparatus. The position of the engine relative to the lead blocks is immaterial, within reasonable limits. It will usually be below the blocks but may also be to one side over a very wide range, since the lead blocks and tail block may be advanced over considerable timber without changing the position of the engine.

Arranged on the lifting line with supporting pulleys resting on each span of the line, is a traveler or carriage 15 from which the choker lines 16 are swung on the spreader bar 17. Movement of the traveler on the lifting line is effected by the lines 18 and 19, one end of each of which is attached to the traveler. The line 18 passes around the tail block 21 connected to the anchor lines 13, then through suitably placed guide blocks 22 to drum 4 of the engine. The line 19 passes around the lead block 23 and thence to drum 5 of the engine.

From the above it will be clear that by appropriate operation and control of the drums 4 and 5 the traveler may be run out or in to any desired position in the span of the lifting line, and by slacking off on either or both sides of the lifting line, the traveler is lowered near enough to a given log to permit the adjustment of the choker lines. Either or both drums 2 and 3 may now be turned to raise the lifting line and traveler with the depending log, and with suitable control of the traveler by the traveler line. On drum 4 and 5, the log may be conveyed to the waiting car. Because of the independence of control of the drums great rapidity of handling is possible, since for example the log may be drawn in at the same time that it is being raised. Because of the distances involved, operations are conducted by telephone, the engineer never seeing the logs, but merely operating the drums in response to instructions phoned from the loading station.

After the logs have been cleared out over the territory within easy reach of the lines, the tail blocks are shifted to a new anchorage to one side, or both tail blocks and lead blocks are shifted, to move the span of lifting line across new territory. One of the advantages of my apparatus lies in the quickness with which such shifts may be made. Formerly it has taken hours of strenuous labor to transfer the anchorage on aerial lines, but I am able to make a transfer in a few minutes. Fig. 3 illustrates the shifting of the tail blocks 12 and 21. The new spar tree 25 being selected and the lifting line slackened, a block 26 is secured to a stump 27 about half way between the old and new spars. A block 28 is also secured to the tail block 12. A tackle 29 is then run between the blocks 26 and 28 as shown in Fig. 3, the free end being made fast to the traveler which previously has been moved up close to the tail block. Drum 5 is then started to haul in line 19, line 18 being correspondingly paid out, so that the traveler is hauled toward the lead block 9 in the direction of arrow 31. By reason of the tackle 29, such movement of the traveler effects a swinging of the tail block 12 through a path indicated by line 32. This movement is continued until the anchor lines 13 have reached the position shown by dotted lines 33, at which point the shifting tackle carries the weight of the lifting lines, and the anchor lines 13 are slack enough to permit them to be disconnected from the tail block. New anchor lines 34 previously slung to the new spar tree are now connected to the tail block and the line 19 slacked off, permitting the tackle 29 to run out until the weight of the system is taken on the new anchor lines, the system finally swinging into the position indicated by lines 36. The tackle 29 is then disconnected, and the lead block 9 shifted in the same manner. The lifting lines now stretch over new territory and the handling of logs is resumed after an interruption of but a few minutes. It is of course necessary to choose the temporary spar 27 and new spar 25 with due regard to the length of the anchor lines which are a little more than half as long as the width of each shift.

I claim:

1. A logging apparatus comprising a pair of drums, means for operating the drums, a tail block removed from the drums, a lifting line passing around the tail block and with an end wound on each drum, and a traveler supported on both spans of the lifting line.

2. A logging apparatus comprising a pair of drums, means for operating the drums independently and together, a tail block removed from the drums, a lifting line passing around the tail block and with an end wound on each drum, and a traveler supported on both spans of the lifting line.

3. A logging apparatus comprising a pair of drums, means for operating the drums, a tail block removed from the drums, a lifting line passing around the tail block and with an end wound on each drum, a traveler supported on both spans of the lifting line, and means for moving the traveler along the lifting line.

4. A logging apparatus comprising a pair of drums, means for operating the drums, a tail block removed from the drums, a lifting line passing around the tail block and with an end wound on each drum, a traveler supported on both spans of the lifting line, a line connected to the traveler, drums for controlling the movement of the traveler line, and means for operating the traveler line drums.

5. A logging apparatus comprising a pair of drums, means for operating the drums, a tail block removed from the drums, a lifting line passing around the tail block and with an end wound on each drum, a traveler supported on both spans of the lifting line, means for moving the traveler along the lifting line and an anchor line interposed between the tail block and the anchorage.

6. A logging apparatus comprising a pair of drums, means for operating the drums, a tail block removed from the drums, a lifting line passing around the tail block and with an end wound on each drum, lead blocks for directing the lifting line to the drums, a traveler supported on both spans of the lifting line, a line connected to the traveler, drums for controlling the movement of the traveler line, lead blocks for directing the traveler line to its drums, and means for operating the traveler line drums.

7. A logging apparatus comprising a pair of drums, means for operating the drums, a tail block removed from the drums, a lifting line passing around the tail block and with an end wound on each drum, lead blocks for directing the lifting line to the drums, a traveler supported on both spans of the lifting line, a line connected to the traveler, drums for controlling the movement of the traveler line, lead blocks for directing the traveler line to its drums, a tail block for the traveler line, means for operating the traveler line drums, and an anchor line interposed between the tail blocks and their anchorage.

8. A logging apparatus comprising a pair of drums, means for operating the drums, a tail block removed from the drums, a lifting line passing around the tail block and with an end wound on each drum, lead blocks for directing the lifting line to the drum, a traveler supported on both spans of the lifting line, means on the traveler for holding a log, a line connected to the traveler, drums for controlling the movement of the traveler line, means for operating the traveler line drums, a tail block for the traveler line, and lead blocks for directing the traveler line to its drums.

9. The method of laterally shifting the lifting lines in a logging apparatus comprising lifting lines, a traveler on said lifting lines, and traveler control lines, which comprises operating a shifting tackle with said traveler control lines to shift one end of the lifting lines to a position substantially half way between the old and new positions of the lifting lines, attaching new anchor lines, detaching the old anchor lines and slacking off on the shifting tackle.

10. The method of laterally shifting the lifting line in a logging apparatus comprising lifting lines, a traveler on said lifting lines, and traveler control lines, which comprises rigging blocks and tackle between that block of the lifting line which is to be shifted and a spar tree between the old and new spars, the tackle being operatively connected to the traveler control lines, operating the traveler control lines to operate the tackle to shift the lifting line laterally until the weight thereof is carried by said tackle, detaching the old anchor lines and attaching the new anchor lines, and slacking off on the tackle to transfer the weight of the lifting line to the new anchor lines.

In testimony whereof, I have hereunto set my hand.

DAVENPORT LAWSON.